(12) United States Patent
Elliott et al.

(10) Patent No.: US 11,892,971 B2
(45) Date of Patent: Feb. 6, 2024

(54) NON-DISRUPTIVE REPAIR OF ENCLOSURE CONTROLLER COMPONENTS

(71) Applicant: International Business Machines Corporation, Armonk, NY (US)

(72) Inventors: John C. Elliott, Tucson, AZ (US); Gary W. Batchelor, Tucson, AZ (US); Enrique Q. Garcia, Tucson, AZ (US); Ronald D. Martens, Benson, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 16/290,805

(22) Filed: Mar. 1, 2019

(65) Prior Publication Data
US 2020/0278946 A1    Sep. 3, 2020

(51) Int. Cl.
*G06F 15/78*    (2006.01)
(52) U.S. Cl.
CPC ............................ *G06F 15/7882* (2013.01)
(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505; G06F 15/7882
See application file for complete search history.

(56) References Cited

U.S. PATENT DOCUMENTS 5,369,749 A     11/1994  Baker et al.
6,085,333 A *   7/2000  DeKoning ............... G05B 9/03
                                                                714/6.32
6,199,130 B1    3/2001   Berglund et al.
6,205,503 B1 *  3/2001   Mahalingam ....... G06F 13/4086
                                                                709/229
7,036,033 B1    4/2006   Price
(Continued)

FOREIGN PATENT DOCUMENTS

EP          092863 A1        11/1983

OTHER PUBLICATIONS

IBM Corporation, "Power Systems, Concurrent Maintenance," 2009, available at https://www.ibm.com/support/knowledgecenter/POWER6/ared3/ared3.pdf.

*Primary Examiner* — Zahid Choudhury
(74) *Attorney, Agent, or Firm* — Scott S. Dobson (57) ABSTRACT

A method is disclosed for maintaining a current operating state of an enclosure when a controller card of the enclosure is repaired and/or replaced. In one embodiment, such a method maintains, within a controller card of an enclosure, operating parameters used to establish an operating state of the enclosure. The method further offloads, from the controller card while the controller card is installed in the enclosure, the operating parameters to a location external to the controller card. Upon removal of the controller card from the enclosure, the method maintains the operating state of the enclosure using the operating parameters stored in the external location. Upon reinstalling the controller card in the enclosure, the method optionally retrieves the operating parameters from the external location and initializes the controller card with the operating parameters. A corresponding system and computer program product are also disclosed.

20 Claims, 7 Drawing Sheets

(56) References Cited

U.S. PATENT DOCUMENTS

| | | | |
|---|---|---|---|
| 2004/0059901 A1* | 3/2004 | Miller | H04L 67/1097 713/1 |
| 2006/0294305 A1* | 12/2006 | Ballard | G11B 15/689 711/115 |
| 2008/0130219 A1 | 6/2008 | Rabinovitz | |
| 2010/0280635 A1* | 11/2010 | Cohn | H04L 69/26 700/90 |
| 2015/0095687 A1* | 4/2015 | Spry | G06F 1/3278 713/324 |
| 2016/0232383 A1* | 8/2016 | Chakhaiyar | G06F 12/0246 |
| 2017/0147427 A1* | 5/2017 | Nero | G05B 19/0425 |
| 2018/0019876 A1 | 1/2018 | Moss et al. | |

* cited by examiner

NON-DISRUPTIVE REPAIR OF ENCLOSURE CONTROLLER COMPONENTS

BACKGROUND

Field of the Invention

This invention relates to systems and methods for non-disruptively repairing enclosure controller components.

Background of the Invention

Electronics enclosures typically include various control functions to manage and monitor parameters such as fan speed, bulk power supply, power boundaries, temperature, and the like. Often, these control functions are implemented with two controllers to provide redundant operation as well as provide the ability to repair or replace a controller (often embodied as a hardware expansion card) while maintaining operation of the enclosure. For cost reasons, a single controller may be used in some implementation or multiple controllers may be mounted on the same hardware expansion card. In such implementations, it may be difficult to maintain operation of the enclosure when a controller card is removed and/or repaired.

Furthermore, a controller card when installed and booted may reset power boundaries, fan speeds, environmental controls, and the overall enclosure control state. This may change the operating state of the enclosure. In implementations where redundant controllers on separate cards are used, the controller card under repair may be prevented from affecting the system until enabled by a higher level system function or the partner controller card. The enclosure controllers are therefore either not redundant or not present for extended periods of time during repair or replacement. Reboot of a controller card may, in some implementations, cause the enclosure power to default to an on state or cause the enclosure to shut off. Where a single controller is used, removing the controller card may, in certain implementations, cause the enclosure to shut off.

In view of the foregoing, what are needed are systems and methods to, when an enclosure controller card is repaired and/or replaced, enable the enclosure to maintain a current operating state. Ideally, such systems and methods will prevent automatic shut offs or other state changes when a controller card reboots.

SUMMARY

The invention has been developed in response to the present state of the art and, in particular, in response to the problems and needs in the art that have not yet been fully solved by currently available systems and methods. Accordingly, embodiments of the invention have been developed to maintain a current operating state of an enclosure when a controller card of the enclosure is repaired and/or replaced. The features and advantages of the invention will become more fully apparent from the following description and appended claims, or may be learned by practice of the invention as set forth hereinafter.

Consistent with the foregoing, a method is disclosed for maintaining a current operating state of an enclosure when a controller card of the enclosure is repaired and/or replaced. In one embodiment, such a method maintains, within a controller card of an enclosure, operating parameters used to establish an operating state of the enclosure. The method further offloads, from the controller card while the controller card is installed in the enclosure, the operating parameters to a location external to the controller card. Upon removal of the controller card from the enclosure, the method maintains the operating state of the enclosure using the operating parameters stored in the external location. Upon reinstalling the controller card in the enclosure, the method may optionally retrieve the operating parameters from the external location and initialize the controller card with the operating parameters.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
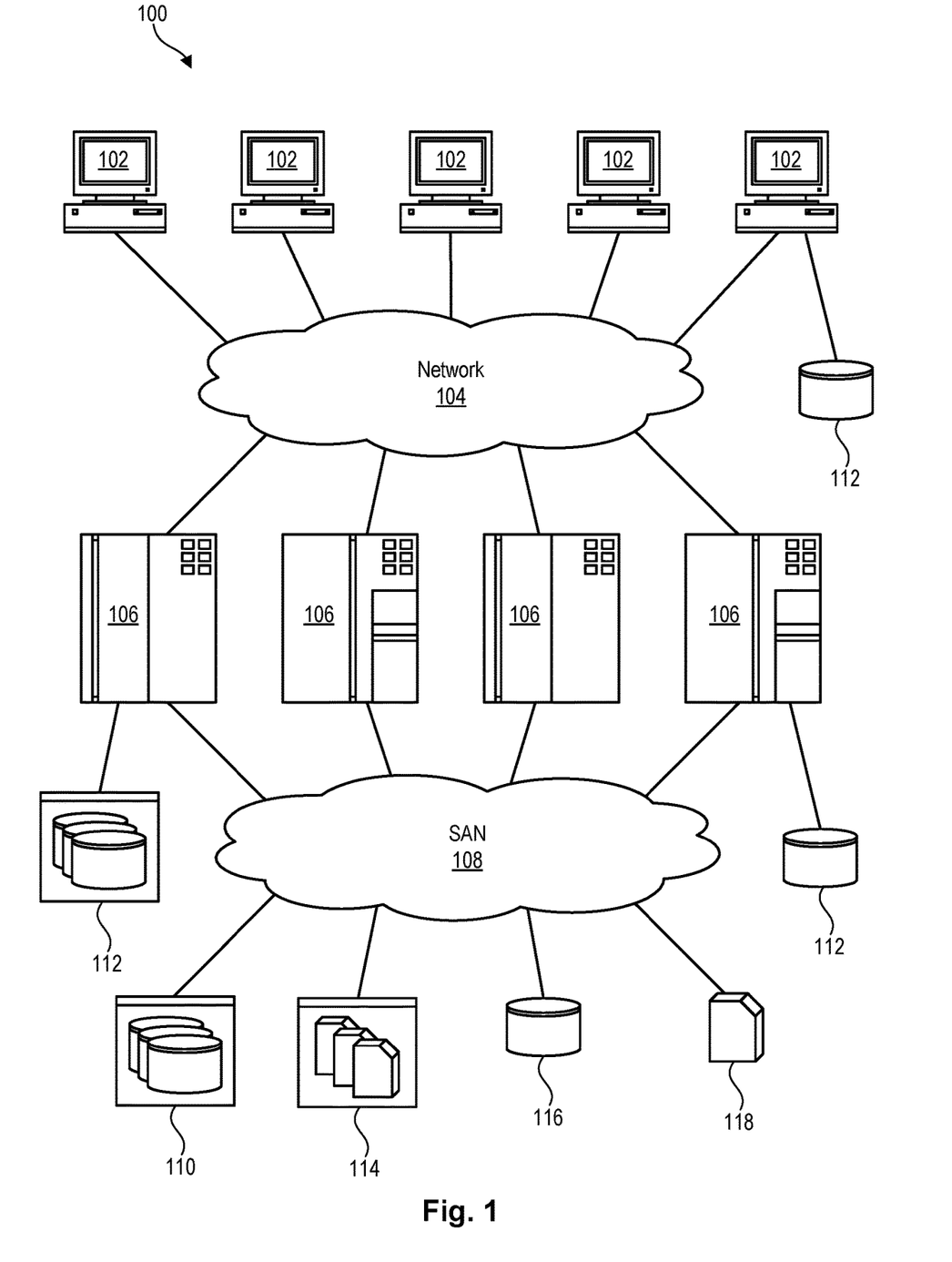
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
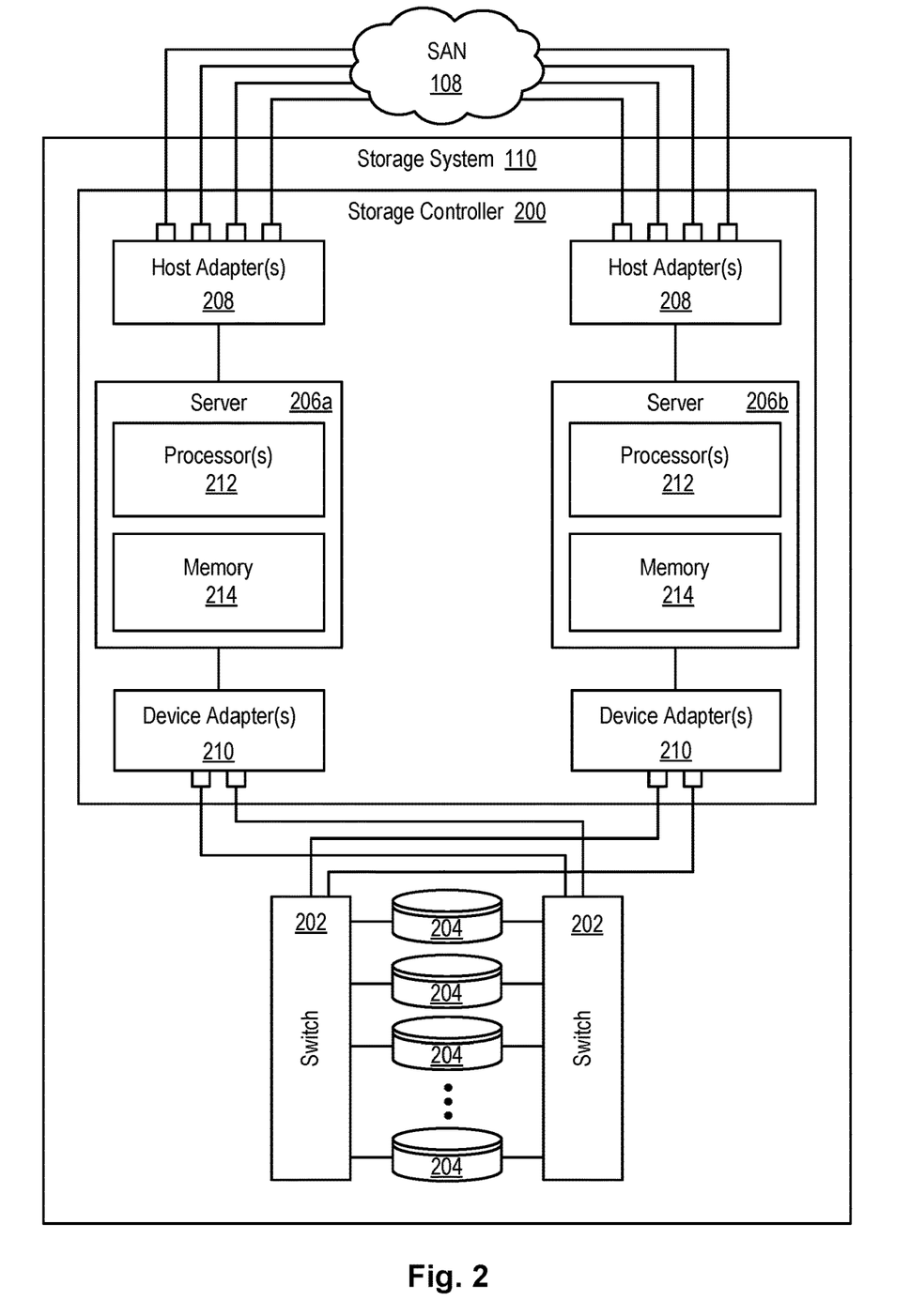
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
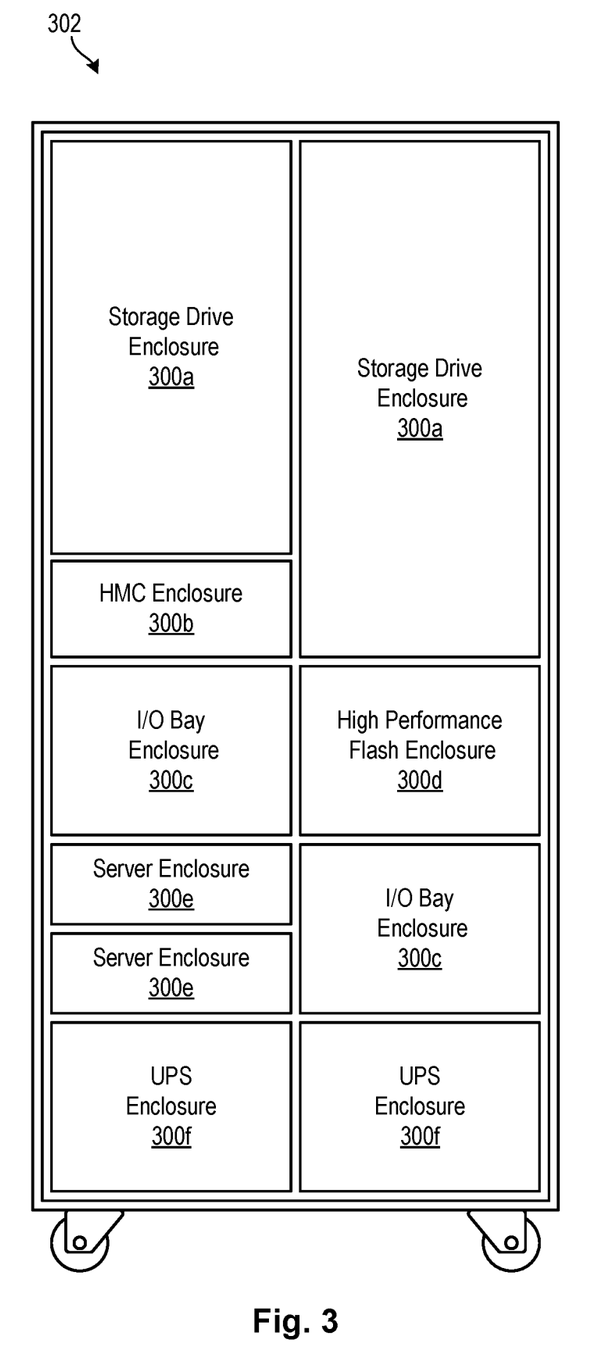
FIG. 3 is a high-level block diagram showing components of a storage system such as that illustrated in FIG. 2 contained within a rack.

Referring to FIG. 3, in certain embodiments, the components of a storage system 110 such as that illustrated in FIG. 2 may be contained in various enclosures 300 mounted, for example, within a rack 302. For example, the storage drives 204 may be contained within storage drive enclosures 300a, the host adapters 208 and/or device adapters 210 may be contained within I/O bay enclosures 300c, the servers 206a, 206b may be contained within server enclosures 300e, and so forth. In the illustrated embodiment, the rack 302 may also include an enclosure 300b that contains a hardware management console (HMC), enclosures 300f that contain uninterruptible power supplies (UPSs), and an enclosure 300d that contains high performance flash memory. These enclosures 300 are simply provided by way of example and not limitation. Other types of enclosures 300 are possible and within the scope of the invention.

Enclosures 300 such as those shown in FIG. 3 typically include various control functions to manage and monitor parameters such as fan speed, bulk power supply, power boundaries, temperature, and the like, within the enclosure 300. Often, these control functions are implemented with two controllers to provide redundant operation as well as provide the ability to repair or replace a controller (often embodied as a hardware expansion card) while maintaining operation of the enclosure 300. For cost reasons, a single controller may be used in some implementation or multiple controllers may be mounted on the same hardware expansion card. In such implementations, it may be difficult to maintain operation of the enclosure 300 when a controller card is removed and/or repaired.

Furthermore, a controller card when installed and booted may reset power boundaries, fan speeds, environmental controls, and the overall control state of the enclosure 300. This may change the operating state of the enclosure 300. In implementations where redundant controllers on separate cards are used, the controller card under repair may be prevented from affecting the system until enabled by a higher level system function or the partner controller card. The enclosure controllers are therefore either not redundant or not present for extended periods of time during a repair or replacement. Reboot of a controller card may, in some cases, cause the enclosure power to default to an on state or cause the enclosure 300 to shut off. Where a single controller is used, removing the controller card may, in certain implementations, cause the enclosure 300 to shut off. Thus, systems and methods are needed to, when an enclosure controller card is repaired and/or replaced, enable the enclosure 300 to maintain a current operating state. Ideally, such systems and methods will prevent automatic shut offs or other state changes when a controller card reboots.

Figure 4:
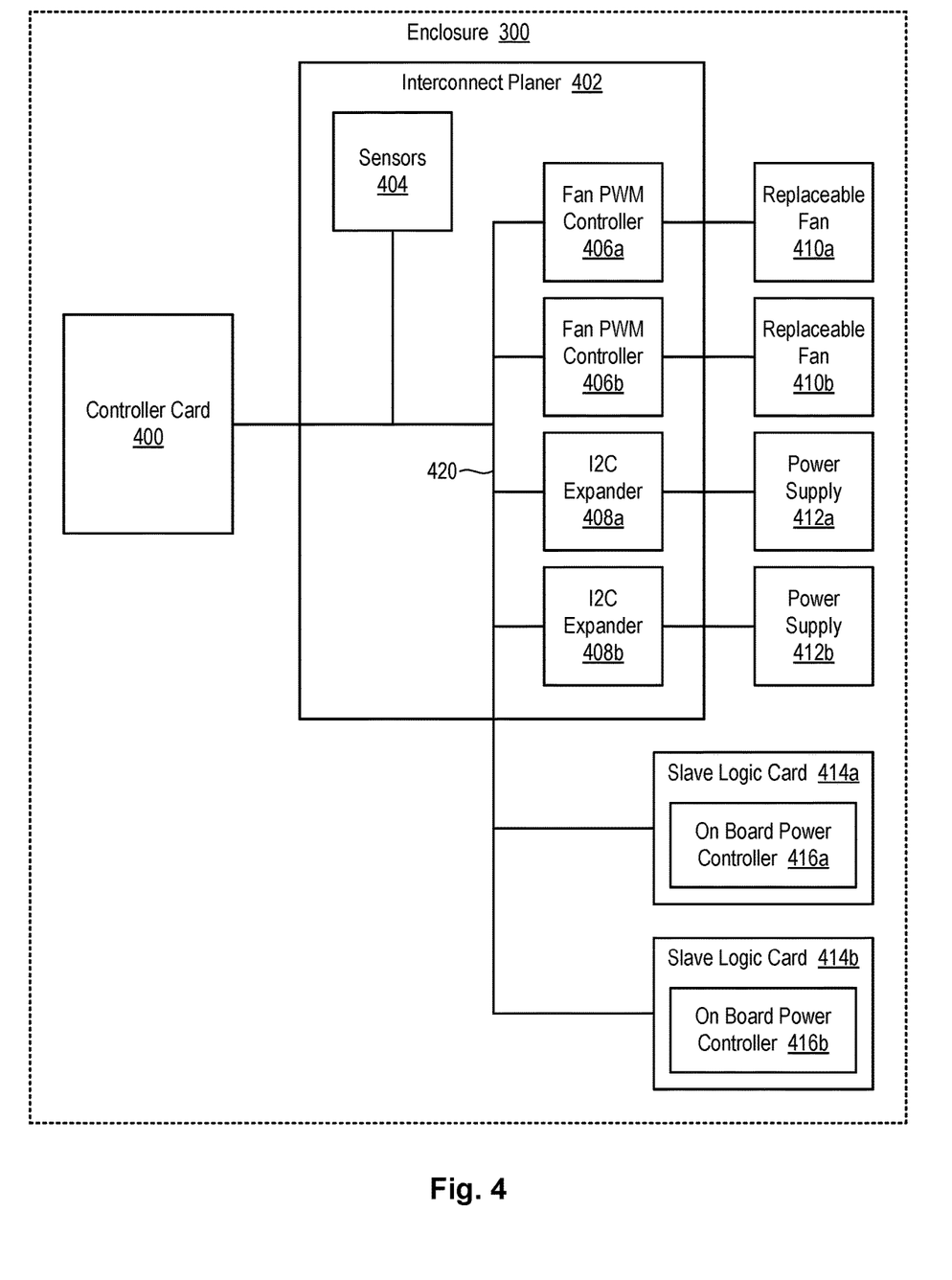
FIG. 4 is a high-level block diagram showing various control components within an enclosure.

FIG. 4 is a high-level block diagram showing various control components that may be included within an enclosure 300. As shown, in certain embodiments, an enclosure 300 may include a controller card 400 that manages and monitors operating parameters such as fan speed, bulk power supply, power boundaries, temperature, and the like. The controller card 400 may periodically set environment controls to appropriate values as determined from a desired system state and/or a current environment. The controller card 400 may, in certain embodiments, query sensors 404 and power states to identify fault conditions within an enclosure 300 and report or respond to these conditions. In certain embodiments, buffers such as I2C expanders 406, 408 may be used to set and hold control bits that establish an operating state of the enclosure 300. In certain cases, fan control may require a constant modulated pulse width cycle to set the speed of the fan 410. Stopping the modulated pulse may, in certain cases, cause the fan 410 to either go to a maximum or minimum speed. Removing control may, in certain cases, cause the fan 410 to go to a high or low speed.

In the illustrated embodiment, the controller card 400 is coupled to an interconnect planar 402 that contains various components 406, 408 (e.g., chips 404, 406, 408) connected to a bus 420, such as an I2C bus 420. These components 404, 406, 408 may include, for example, pulse width modulation (PWM) controllers 406 for controlling replaceable fans 410 of the enclosure 300, I2C expanders 408 for controlling power supplies 412 of the enclosure 300, or the like. In certain embodiments, the bus 420 may also communicate with various on-card power controllers 416 located on slave logic cards 414 connected to the interconnect planar 402. The on-card power controllers 416 may turn the slave logic cards 414 on or off based on signals that are received from the controller card 400 through the bus 420.

Figure 5:
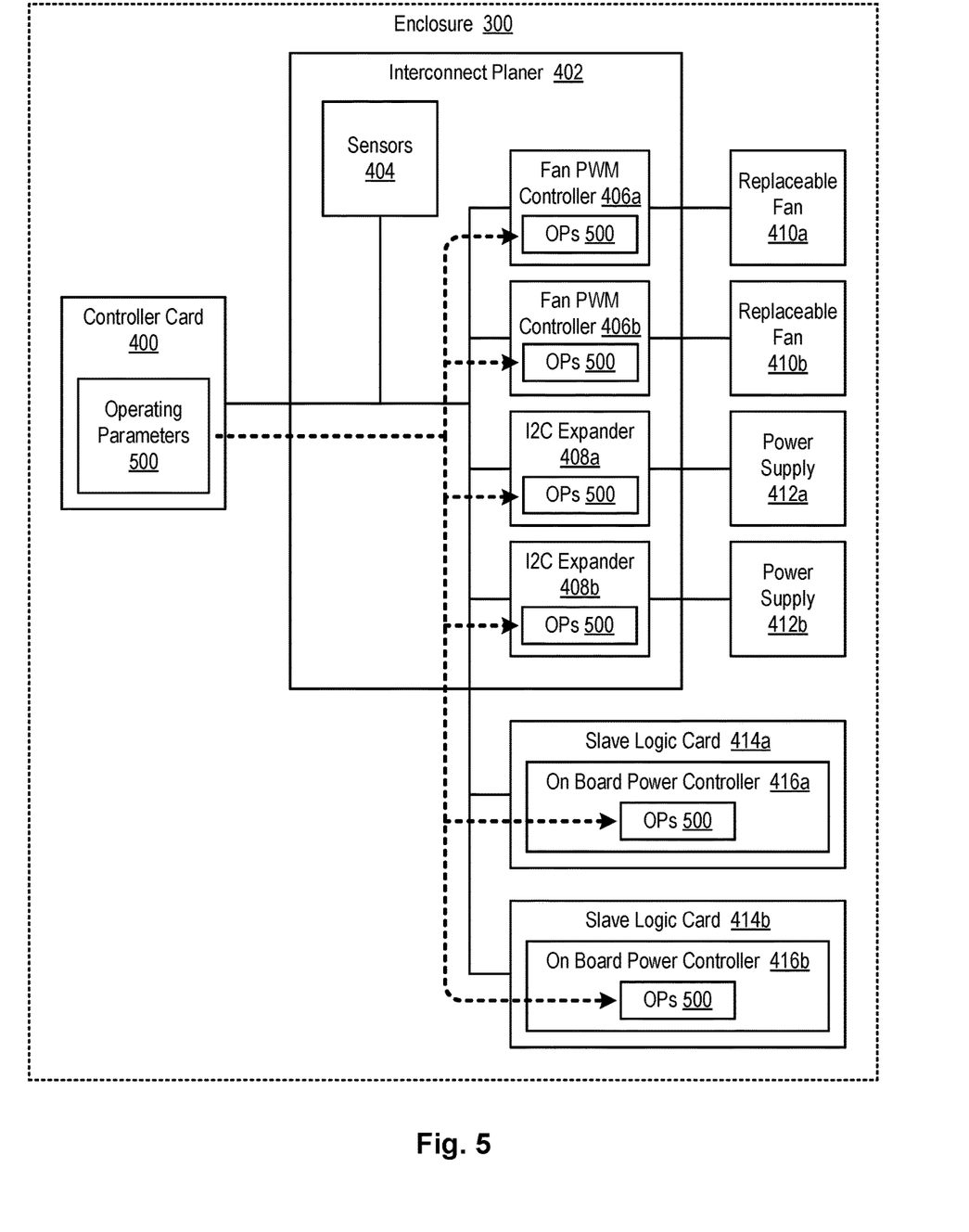
FIG. 5 is a high-level block diagram showing the offloading of controller card operating parameters to external components.

Referring to FIG. 5, in certain embodiments, the controller card 400 establishes and maintains various operating parameters 500 that control an operating state (e.g., fan speed, power supply settings, environmental settings, etc.) of the enclosure 300. In certain embodiments in accordance with the invention, the operating parameters 500 may be offloaded from the controller card 400 to various components 406, 408, 416 external to the controller card 400, such as components 406, 408 on the interconnect planar 402, or logic cards 414 connected to the interconnect planar 402. As the operating parameters 500 change in response to changing environmental conditions and/or sensor data associated with the enclosure 300, the controller card 400 may update the operating parameters 500 within the external components 406, 408, 416 to reflect the updated operating parameters 500 on the controller card 400.

Figure 6:
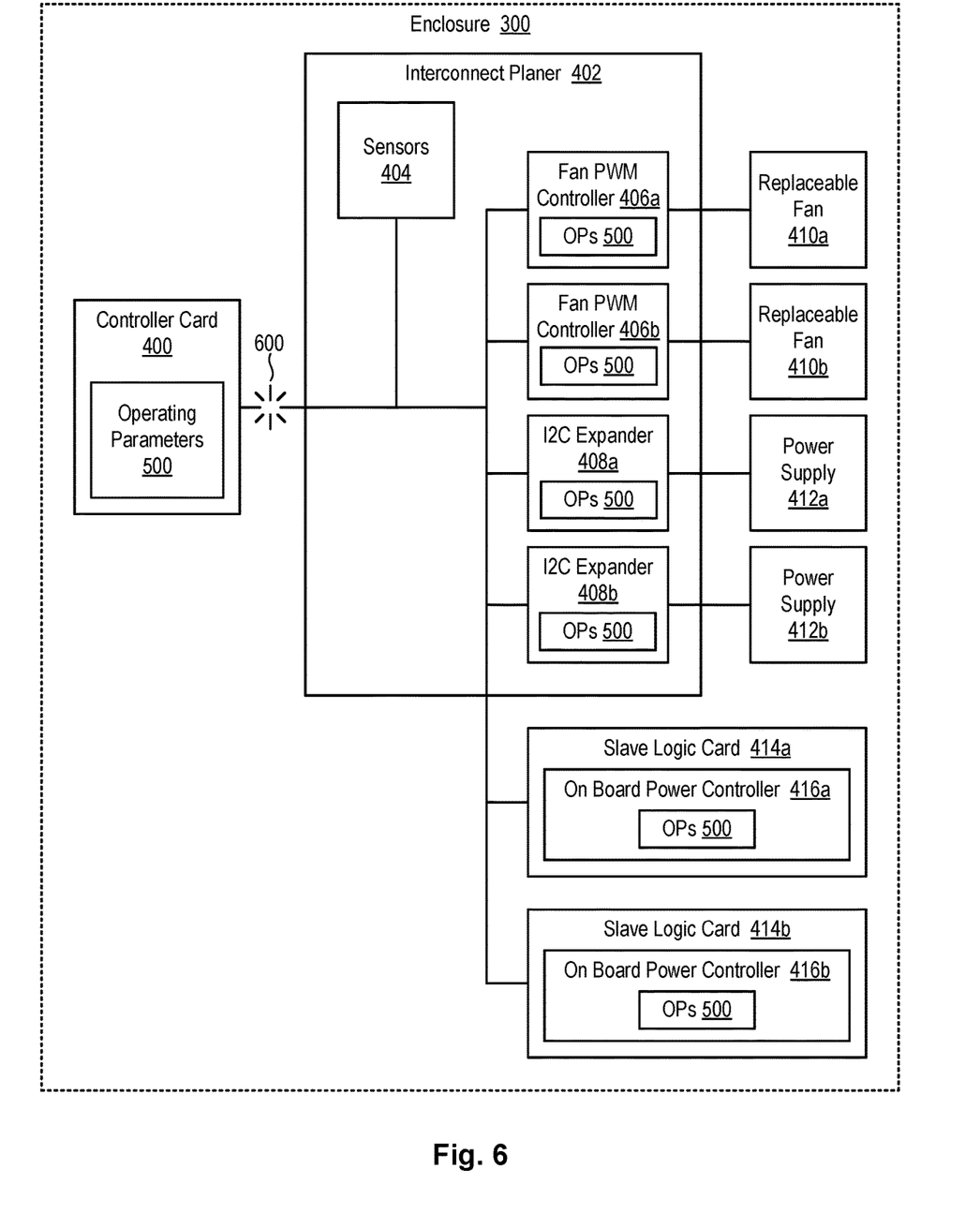
FIG. 6 is a high-level block diagram showing the maintaining of an operating state of the enclosure using the operating parameters stored in the external components.

Referring to FIG. 6, when the controller card 400 is decoupled 600 from the interconnect planar 402, such as when the controller card 400 is repaired or replaced, systems and methods in accordance with the invention may utilize the operating parameters 500 stored in the components 406, 408, 416 to maintain a current operating state of the enclosure 300. More specifically, the components 406, 408, 416 may use the internally stored operating parameters 500 to maintain an operating state of the enclosure 300 that existed at the time the controller card 400 was decoupled 600 (e.g., removed) from the enclosure 300. This will enable fans speeds, power supply states, environmental settings, and the like to continue uninterrupted within the enclosure 300 even after removal of the controller card 400.

Figure 7:
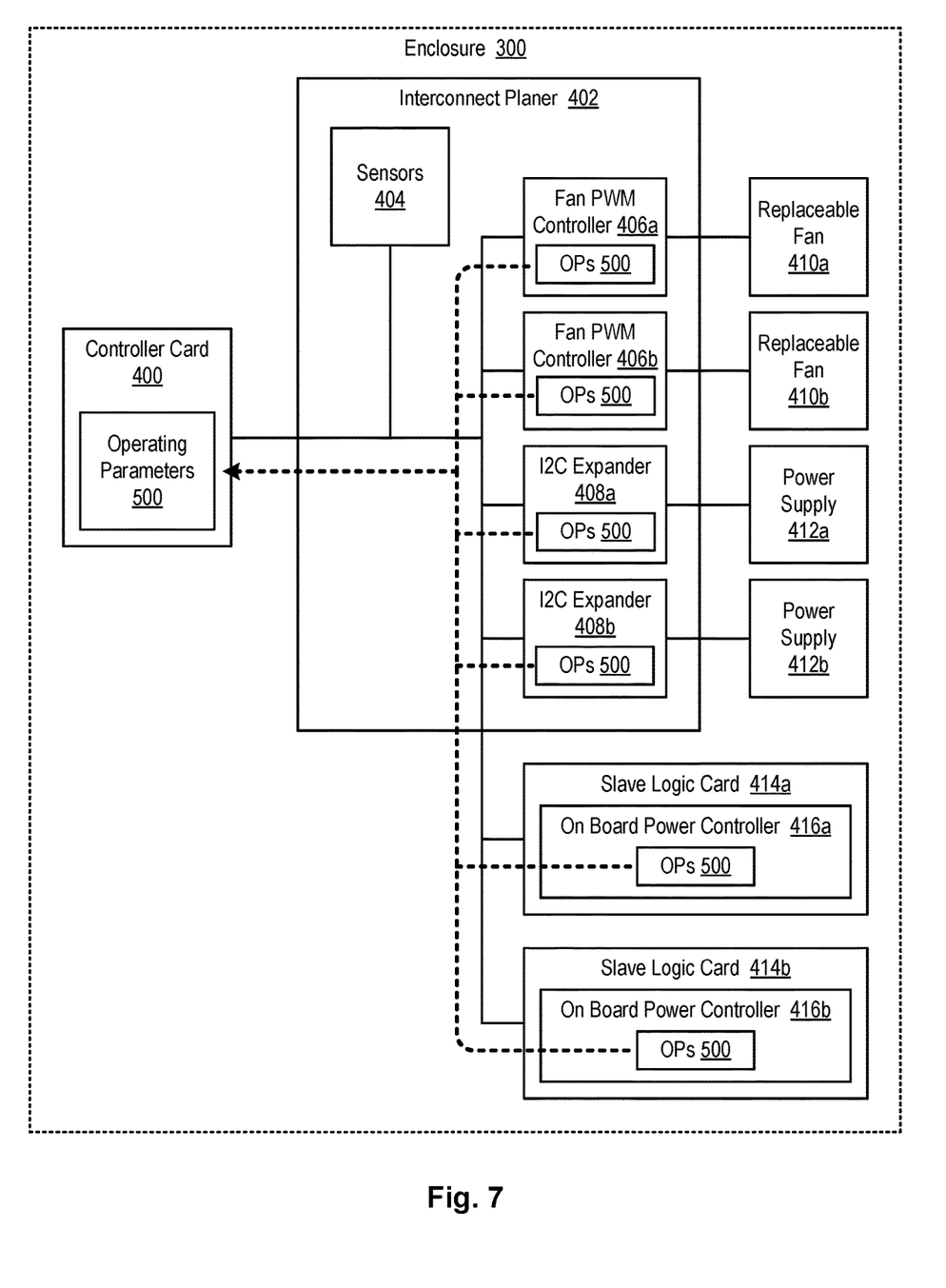
FIG. 7 is a high-level block diagram showing the retrieving of operating parameters from the external components and initializing the controller card with the operating parameters.

Referring to FIG. 7, when a controller card 400 is recoupled to the interconnect planar 402, the controller card 400 may, in certain cases, be configured to retrieve the operating parameters 500 from the components 406, 408, 416 and initialize itself with these operating parameters 500. This will allow the newly installed controller card 400 to maintain the current operating state of the enclosure 300. The newly installed controller card 400 may then begin to control and adjust the operating parameters 500 and associated operating state in accordance with changing environmental conditions and/or sensor input data as the controller card 400 did prior to its removal. In the event operating parameters 500 are not available, such as if the enclosure 300 is not active or is shut off, the newly installed controller card 400 may initialize itself with a set of default or standby operating parameters 500 that may then be adjusted in accordance with changing environmental conditions and/or sensor input data. In this way, the operating state of the enclosure 300 may be maintained with little if any interruption. After a controller card 400 is reinstalled, the operating parameters 500 may once again be continually updated on the components 406, 408, 416 in the event the controller card 400 needs to be removed or repaired again at some point in the future.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for maintaining a current operating state of an enclosure when a controller card of the enclosure is repaired and/or replaced, the method comprising:
   maintaining, within a controller card of an enclosure, operating parameters used to establish an operating state of the enclosure;
   using, by the controller card, the operating parameters to control the operating state;
   offloading, from the controller card while the controller card is installed in the enclosure, the operating parameters to a location external to the controller card; and
   upon removal of the controller card from the enclosure and before reinstalling the controller card or turning over control to a different controller card, maintaining, using the operating parameters stored in the external location, the operating state of the enclosure at a state that existed at a time the controller card was removed from the enclosure.

2. The method of claim 1, wherein the external location is within the enclosure.

3. The method of claim 2, wherein the external location is located on an interconnect planar configured to receive the controller card.

4. The method of claim 3, wherein the external location is located within at least one I2C chip mounted on the interconnect planar.

5. The method of claim 1, further comprising, upon reinstalling the controller card in the enclosure, retrieving the operating parameters from the external location to the controller card.

6. The method of claim 5, further comprising initializing the controller card with the operating parameters retrieved from the external location.

7. The method of claim 1, wherein the operating parameters include at least one of fan settings, power supply settings, and environmental controls.

8. A computer program product for maintaining a current operating state of an enclosure when a controller card of the enclosure is repaired and/or replaced, the computer program product comprising a computer-readable medium having computer-usable program code embodied therein, the computer-usable program code configured to perform the following when executed by at least one processor:
   maintain, within a controller card of an enclosure, operating parameters used to establish an operating state of the enclosure;
   use, by the controller card, the operating parameters to control the operating state;

offload, from the controller card while the controller card is installed in the enclosure, the operating parameters to a location external to the controller card; and upon removal of the controller card from the enclosure and before reinstalling the controller card or turning over control to a different controller card, maintain, using the operating parameters stored in the external location, the operating state of the enclosure at a state that existed at a time the controller card was removed from the enclosure.

9. The computer program product of claim 8, wherein the external location is within the enclosure.

10. The computer program product of claim 9, wherein the external location is located on an interconnect planar configured to receive the controller card.

11. The computer program product of claim 10, wherein the external location is located within at least one I2C chip mounted on the interconnect planar.

12. The computer program product of claim 8, wherein the computer-usable program code is further configured to, upon detecting reinstallation of the controller card in the enclosure, retrieve the operating parameters from the external location to the controller card.

13. The computer program product of claim 12, wherein the computer-usable program code is further configured to initialize the controller card with the operating parameters retrieved from the external location.

14. The computer program product of claim 8, wherein the operating parameters include at least one of fan settings, power supply settings, and environmental controls.

15. A system for maintaining a current operating state of an enclosure when a controller card of the enclosure is repaired and/or replaced, the system comprising:

at least one processor;

at least one memory device coupled to the at least one processor and storing instructions for execution on the at least one processor, the instructions causing the at least one processor to:

maintain, within a controller card of an enclosure, operating parameters used to establish an operating state of the enclosure;

use, by the controller card, the operating parameters to control the operating state;

offload, from the controller card while the controller card is installed in the enclosure, the operating parameters to a location external to the controller card; and upon removal of the controller card from the enclosure and before reinstalling the controller card or turning over control to a different controller card, maintain, using the operating parameters stored in the external location, the operating state of the enclosure at a state that existed at a time the controller card was removed from the enclosure.

16. The system of claim 15, wherein the external location is within the enclosure.

17. The system of claim 16, wherein the external location is located on an interconnect planar configured to receive the controller card.

18. The system of claim 17, wherein the external location is located within at least one I2C chip mounted on the interconnect planar.

19. The system of claim 15, wherein the instructions further cause the at least one processor to, upon detecting reinstallation of the controller card in the enclosure, retrieve the operating parameters from the external location to the controller card.

20. The system of claim 19, wherein the instructions further cause the at least one processor to initialize the controller card with the operating parameters retrieved from the external location.

\* \* \* \* \*